(12) United States Patent
Kerfoot

(10) Patent No.: US 7,666,316 B2
(45) Date of Patent: Feb. 23, 2010

(54) PERMANGANATE-COATED OZONE FOR GROUNDWATER AND SOIL TREATMENT WITH IN-SITU OXIDATION

(75) Inventor: William B. Kerfoot, Falmouth, MA (US)

(73) Assignee: ThinkVillage-Kerfoot, LLC, Boulder, CO (US)

( * ) Notice: Subject to any disclaimer, the term of this patent is extended or adjusted under 35 U.S.C. 154(b) by 375 days.

(21) Appl. No.: 11/145,871

(22) Filed: Jun. 6, 2005

(65) Prior Publication Data
US 2006/0016766 A1 Jan. 26, 2006

Related U.S. Application Data

(63) Continuation-in-part of application No. 10/895,015, filed on Jul. 20, 2004.

(51) Int. Cl.
*C02F 1/78* (2006.01)
(52) U.S. Cl. .................... 210/760; 405/128.5
(58) Field of Classification Search ........... 210/747, 210/760, 170.07, 96.1, 143, 192, 198.1, 416.1; 405/128.5; 222/52
See application file for complete search history.

(56) References Cited

U.S. PATENT DOCUMENTS

| | | |
|---|---|---|
| 1,920,719 A | 8/1933 | Stich |
| 2,517,525 A | 8/1950 | Cummings |
| 2,845,185 A | 7/1958 | Winderweedle, Jr. |
| 2,946,446 A | 7/1960 | Herbert |
| 3,027,009 A | 3/1962 | Price |
| 3,206,178 A | 9/1965 | Lamb |
| 3,219,520 A | 11/1965 | Box |
| 3,276,994 A | 10/1966 | Andrews |
| 3,441,216 A | 4/1969 | Good |
| 3,570,218 A | 3/1971 | Finney |
| 3,669,276 A | 6/1972 | Woods |
| 3,708,206 A | 1/1973 | Hard et al. |
| 3,814,394 A | 6/1974 | Murray |
| 3,823,776 A | 7/1974 | Holmes |
| 3,997,447 A | 12/1976 | Breton et al. |
| 4,007,118 A | 2/1977 | Ciambrone |
| 4,021,347 A | 5/1977 | Teller et al. |
| 4,048,072 A | 9/1977 | McCullough |
| 4,049,552 A | 9/1977 | Arff |
| 4,064,163 A | 12/1977 | Drach et al. |

(Continued)

FOREIGN PATENT DOCUMENTS

DE 3805200 9/1998

(Continued)

OTHER PUBLICATIONS

Civil Action No. 1:08-cv-11711-GAO, Groundwater & Environmental Services, Inc.'s Supplemental Response to Plaintiffs Interrogatory Three, Jun. 25, 2009, 36 pages.

(Continued)

*Primary Examiner*—Walter D Griffin
*Assistant Examiner*—Cameron J Allen
(74) *Attorney, Agent, or Firm*—Lathrop & Gage LLP

(57) ABSTRACT

Permanganate is delivered by a device that allows delivery of the permanganate and an air-ozone mixture to a soil formation. The permanganate can be delivered as a coating over microbubbles including the air/ozone gas stream.

24 Claims, 6 Drawing Sheets

U.S. PATENT DOCUMENTS

| | | |
|---|---|---|
| 4,118,447 A | 10/1978 | Richter |
| 4,178,239 A | 12/1979 | Lowther |
| 4,203,837 A | 5/1980 | Hoge et al. |
| 4,268,283 A | 5/1981 | Roberts |
| 4,298,467 A | 11/1981 | Gartner et al. |
| 4,310,057 A | 1/1982 | Brame |
| 4,351,810 A | 9/1982 | Martinez et al. |
| 4,360,234 A | 11/1982 | Hsueh et al. |
| 4,614,596 A | 9/1986 | Wyness |
| 4,622,139 A | 11/1986 | Brown |
| 4,639,314 A | 1/1987 | Tyer |
| 4,684,479 A | 8/1987 | D'Arrigo |
| 4,695,447 A * | 9/1987 | Shultz ........................ 588/314 |
| 4,696,739 A | 9/1987 | Pedneault |
| 4,730,672 A | 3/1988 | Payne |
| 4,804,050 A | 2/1989 | Kerfoot |
| 4,832,122 A | 5/1989 | Corey et al. |
| 4,837,153 A | 6/1989 | Laurenson, Jr. |
| 4,838,434 A | 6/1989 | Miller et al. |
| 4,844,795 A | 7/1989 | Halwani |
| 4,883,589 A | 11/1989 | Konon |
| 4,941,957 A | 7/1990 | Zeff et al. |
| 4,943,305 A | 7/1990 | Bernhardt |
| 4,960,706 A | 10/1990 | Bliem et al. |
| 4,966,717 A | 10/1990 | Kern |
| 4,971,731 A | 11/1990 | Zipperian |
| 5,078,921 A | 1/1992 | Zipperian |
| 5,080,805 A | 1/1992 | Houser |
| 5,116,163 A | 5/1992 | Bernhardt |
| 5,120,442 A | 6/1992 | Kull et al. |
| 5,122,165 A | 6/1992 | Wang |
| 5,126,111 A | 6/1992 | Al-Ekabi et al. |
| 5,133,906 A | 7/1992 | Louis |
| 5,160,655 A | 11/1992 | Donker et al. |
| 5,167,806 A | 12/1992 | Wang et al. |
| 5,178,491 A | 1/1993 | Graves et al. |
| 5,178,755 A | 1/1993 | Lacrosse |
| 5,180,503 A | 1/1993 | Gorelick et al. |
| 5,205,927 A | 4/1993 | Wickramanayake |
| 5,215,680 A | 6/1993 | D'Arrigo |
| 5,221,159 A | 6/1993 | Billings et al. |
| 5,227,184 A | 7/1993 | Hurst |
| 5,238,437 A | 8/1993 | Vowles et al. |
| 5,246,309 A | 9/1993 | Hobby |
| 5,248,395 A | 9/1993 | Rastelli et al. |
| 5,254,253 A | 10/1993 | Behmann |
| 5,259,962 A | 11/1993 | Later |
| 5,269,943 A | 12/1993 | Wickramanayake |
| 5,277,518 A | 1/1994 | Billings et al. |
| 5,302,286 A | 4/1994 | Semprini et al. |
| 5,332,333 A | 7/1994 | Bentley |
| 5,362,400 A | 11/1994 | Martinell |
| 5,364,537 A | 11/1994 | Paillard |
| 5,375,539 A | 12/1994 | Rippberger |
| 5,389,267 A | 2/1995 | Gorelick et al. |
| 5,398,757 A | 3/1995 | Corte et al. |
| RE34,890 E | 4/1995 | Sacre |
| 5,402,848 A | 4/1995 | Kelly |
| 5,403,476 A | 4/1995 | Bernhardt |
| 5,406,950 A | 4/1995 | Brandenburger et al. |
| 5,425,598 A | 6/1995 | Pennington |
| 5,427,693 A | 6/1995 | Mausgrover et al. |
| 5,430,228 A | 7/1995 | Ciambrone et al. |
| 5,431,286 A | 7/1995 | Xu et al. |
| 5,451,320 A | 9/1995 | Wang et al. |
| 5,464,309 A | 11/1995 | Mancini et al. |
| 5,472,294 A | 12/1995 | Billings et al. |
| 5,480,549 A | 1/1996 | Looney et al. |
| 5,520,483 A | 5/1996 | Vigneri |
| 5,525,008 A | 6/1996 | Wilson |
| 5,545,330 A | 8/1996 | Ehrlich |
| 5,560,737 A | 10/1996 | Schuring et al. |
| 5,588,490 A | 12/1996 | Suthersan et al. |
| 5,609,798 A | 3/1997 | Liu et al. |
| 5,615,974 A | 4/1997 | Land et al. |
| 5,620,593 A | 4/1997 | Stagner |
| 5,622,450 A | 4/1997 | Grant et al. |
| 5,624,635 A | 4/1997 | Pryor |
| 5,663,475 A | 9/1997 | Elgal |
| 5,664,628 A | 9/1997 | Koehler et al. |
| 5,667,733 A | 9/1997 | Waldron, Sr. |
| 5,676,823 A | 10/1997 | McKay et al. |
| 5,698,092 A | 12/1997 | Chen |
| 5,741,427 A | 4/1998 | Watts et al. |
| 5,827,485 A | 10/1998 | Libal et al. |
| 5,833,388 A * | 11/1998 | Edwards et al. ................ 405/52 |
| 5,851,407 A | 12/1998 | Bowman et al. |
| 5,855,775 A | 1/1999 | Kerfoot |
| 5,860,598 A | 1/1999 | Cruz |
| 5,879,108 A | 3/1999 | Haddad |
| 5,925,257 A | 7/1999 | Albelda et al. |
| 5,954,452 A | 9/1999 | Goldstein |
| 5,967,230 A | 10/1999 | Cooper et al. |
| 5,975,800 A | 11/1999 | Edwards et al. |
| 6,007,274 A | 12/1999 | Suthersan |
| 6,017,449 A | 1/2000 | Eriksson et al. |
| 6,083,403 A | 7/2000 | Tang et al. |
| 6,083,407 A | 7/2000 | Kerfoot |
| 6,086,769 A | 7/2000 | Kilambi et al. |
| 6,136,186 A | 10/2000 | Gonzalez-Martin et al. |
| 6,139,755 A | 10/2000 | Marte et al. |
| 6,210,955 B1 | 4/2001 | Hayes |
| 6,214,240 B1 | 4/2001 | Yasunaga et al. |
| 6,217,767 B1 | 4/2001 | Clark |
| 6,254,310 B1 | 7/2001 | Suthersan |
| 6,283,674 B1 | 9/2001 | Suthersan |
| 6,284,143 B1 | 9/2001 | Kerfoot |
| 6,306,296 B1 | 10/2001 | Kerfoot |
| 6,312,605 B1 | 11/2001 | Kerfoot |
| 6,352,387 B1 * | 3/2002 | Briggs et al. ............ 405/128.25 |
| 6,357,670 B2 | 3/2002 | Ganan-Calvo |
| 6,364,162 B1 | 4/2002 | Johnson |
| 6,391,259 B1 | 5/2002 | Malkin et al. |
| 6,403,034 B1 | 6/2002 | Nelson et al. |
| 6,428,694 B1 | 8/2002 | Brown |
| 6,436,285 B1 | 8/2002 | Kerfoot |
| 6,447,676 B1 | 9/2002 | Kerfoot |
| 6,488,850 B2 | 12/2002 | Perriello |
| 6,533,499 B2 | 3/2003 | Breeding |
| 6,582,611 B1 * | 6/2003 | Kerfoot ..................... 210/747 |
| 6,596,161 B2 | 7/2003 | Kerfoot |
| 6,596,177 B2 | 7/2003 | Sherman |
| 6,623,211 B2 | 9/2003 | Kukor et al. |
| 6,645,450 B2 | 11/2003 | Stoltz et al. |
| 6,733,207 B2 | 5/2004 | Liebert, Jr. et al. |
| 6,736,379 B1 | 5/2004 | Wegner et al. |
| 6,745,815 B1 | 6/2004 | Senyard |
| 6,773,609 B1 | 8/2004 | Hashizume |
| 6,780,329 B2 | 8/2004 | Kerfoot |
| 6,787,038 B2 | 9/2004 | Brusseau et al. |
| 6,805,798 B2 | 10/2004 | Kerfoot |
| 6,818,136 B1 | 11/2004 | Marek |
| 6,827,861 B2 | 12/2004 | Kerfoot |
| 6,866,781 B2 | 3/2005 | Schindler |
| 6,872,318 B2 | 3/2005 | Kerfoot |
| 6,913,251 B2 | 7/2005 | Kerfoot |
| 6,921,477 B2 | 7/2005 | Wilhelm |
| 6,984,329 B2 | 1/2006 | Kerfoot |
| 7,022,241 B2 | 4/2006 | Kerfoot |
| 7,033,492 B2 | 4/2006 | Kerfoot |
| 7,131,638 B2 | 11/2006 | Kerfoot |
| 7,156,984 B2 | 1/2007 | Kerfoot |
| 7,208,090 B2 | 4/2007 | Applegate et al. |
| 7,264,747 B2 | 9/2007 | Kerfoot |

| | | | |
|---|---|---|---|
| 7,300,039 | B2 | 11/2007 | Kerfoot |
| 7,442,313 | B2 | 10/2008 | Kerfoot |
| 7,537,706 | B2 | 5/2009 | Kerfoot |
| 7,547,388 | B2 | 6/2009 | Kerfoot |
| 2002/0029493 | A1 | 3/2002 | Baek |
| 2002/0109247 | A1 | 8/2002 | Jager et al. |
| 2003/0029792 | A1 | 2/2003 | Kerfoot |
| 2003/0222359 | A1 | 12/2003 | Jager |
| 2004/0045911 | A1 | 3/2004 | Kerfoot |
| 2005/0067356 | A1 | 3/2005 | Bowman et al. |
| 2006/0243668 | A1 | 11/2006 | Miller et al. |

FOREIGN PATENT DOCUMENTS

| | | | |
|---|---|---|---|
| EP | 0402158 | | 12/1990 |
| EP | 0546335 | | 6/1993 |
| GB | 2005655 | A * | 4/1979 |
| GB | 2185901 | A | 8/1987 |
| JP | 1-304838 | | 12/1989 |
| JP | 3267196 | | 11/1991 |
| JP | 4-171036 | | 6/1992 |
| JP | 6-023378 | | 1/1994 |
| JP | 409313814 | | 12/1997 |
| WO | WO 98/21152 | | 5/1998 |
| WO | WO 99/54258 | | 10/1999 |
| WO | WO 2005063367 | | 7/2005 |

OTHER PUBLICATIONS

Civil Action No. 1:08-cv-11711-GAO, Groundwater & Environmental Services, Inc.'s Supplemental Response to Plaintiff's Interrogatories Three and Four, Jul. 6, 2009, 164 pages.
U.S. Appl. No. 12/254,359, Notice of Allowance dated Jul. 6, 2009, 4 pages.
U.S. Appl. No. 12/259,051, Response to Office Action filed Jun. 23, 2009, 8 pages.
U.S. Appl. No. 12/272,462, Restriction Requirement mailed Jun. 2, 2009, 6 pages.
U.S. Appl. No. 12/272,462, Response to Restriction Requirement filed Jul. 2, 2009, 12 pages.
U.S. Appl. No. 11/485,080, Notice of Allowance dated Jul. 9, 2009, 4 pages.
PCT/US05/25478, International Search Report & Written Opinion, mailed Feb. 15, 2006, 4 pages.
PCT/US05/25478, International Preliminary Report on Patentability, Jan. 23, 2007, 4 pages.
Advanced Oxidation Processes for Treating Groundwater Contaminated with TCE and PCE, Aieta AXXX et al., 1988, Pilot-Scale Evaluations., Journal of American Water Works Association, JAW-WAS, vol. 80, No. 5, pp. 64-72.
Echegaray, D.F. et al, "Biologically Resistant Contaminants, Primary Treatment with Ozone", Water Science and Technology, A Journal of the International Association on Water Quality, vol. 29, No. 8, 1994, pp. 257-261.
Alternate Technologies for Wastewater Treatment, J. Hauck ct al.. Polluting Engineering, May 1990, pp. 81-84.
Analysis of Selected Enhancements for Soil Vapor Extraction, U.S. Environmental Protection Agency, Sep. 1997, pp. 1-5 to 7-39.
Aquifer Remediation Wells, EPA, vol. 16, Sep. 1999, pp. 1-80.
Chemical Degradation of Aldicarb in Water Using Ozone, F.J. Beltran et al., Journal of Chemical Technology & Biotechnology, 1995, pp. 272-278.
Clare Water Supply, EPA, http://www.eoa.gov/region5/s11ocrfund/nnl/michillan/MID980002273.htm, pp. 1-3, date unknown.
Cleaning up, Forbes, Jun. 1, 1987, pp. 52-53.
Completed North American Innovative remediation Technology Demonstration Projects, U.S. Environmental Protection Agency, Office of Solid Waste and Emergency Response, Aug. 12, 1996, pp. 1-35.
Design of a Packed Bed ozonation Reactor for Removal of Contaminants from Water, Billing, Dissertation Abstracts International, vol. 57, No. 10, Apr. 1997, pp. 6398-B.
Effect of Organic Substances on Mass Transfer in Bubble Aeration, M. Gurol et al. ,Journal WPCF, vol. 57 No. 3, pp. 235-240.
Environmental Management:, DON Environmental Restoration Plan for Fiscal years 1997-2001, Sep. 30, 1996, pp. 4-1 to 4-8.
Factors Controlling the Removal of Organic Pollutants in an Ozone Reactor, M.D. Gurol, AWWA 1984 Annual Conference, Dallas, TX, Jun. 10-14, 1984, pp. 2-21.
Field Applications of In Situ Remediation Technologies: Chemical Oxidation, U.S. Environmental Protection Agency, Sep. 1998, pp. 1-31.
Gas Partitioning of Dissolved Volatile Organic Compounds in the Vadose Zone: Principles, ABBB Temperature Effects and Literature Review, J.W. Washington, Groundwater, vol. 34, No. 4, Jul.-Aug. 1996, pp. 709-718.
Ground Water Issue, H.H. Russell et al., u.s. Environmental Protection Agency, Jan. 1992, pp. 1-10.
Ground Water, Surface Water. and Leachate, http://www.frtr.gov/mlltrix2/section 4/4-30.html, Jul. 22, 2003, pp. 1-4.
How to Evaluate Alternative Cleanup Technologies for Underground Storage Tank Sites, U.S. Environmental Protection Agency, Oct. 1994.
In Situ Air Sparging System, Tech Data Sheet. Naval Facilities Engineering Service Center, Mar. 1997, pp. 1-4.
In Situ Chemical Oxidation for Remediation of Contaminated Soil and Ground Water, EPA, Sep. 2000, Issue No. 37; pp. 1-6.
In Situ Chemical Treatment, Y. Yin, Ph.D., Technology Evaluation Report, GWRTAC, Jul. 1999, pp. 1-74.
In Situ Ozonation to Remediate Recalcitrant Organic Contamination, J. Dablow et al, IT Corporation, .pp. 1-2, date unknown.
In Situ Remediation with Chemical Oxidizers: Ozone, Peroxide and Permanganate, Environmental Bio-systems, Inc., pp. 1-5, date unknown.
In-Situ Air Sparging Without Inorganic Nutrient Amendment: An Effective Bioremediation Strategy for Treating Petroleum-Contaminated Groundwater Systems:, R. Schaffner Jr., et al., http://www.bioremediationgroup.org/BioReferences/Tier_1_Papers/insitu.htm, Jul. 30, 203, pp. 1-14.
Kinetics of the Bentazone Herbicide Ozonation, Journal of Environmental Science and Health, vol. A31, No. 3, 1996, pp. 519-537.
Modelling Industrial Wastewater Ozonation in Bubble Contactors, Ozone Science & Engineering, vol. 17, 1995, pp. 355-378.
Modelling Industrial Wastewater Ozonation in Bubble Contactors, Ozone Science & Engineering, vol. 17, 1995, pp. 379-398.
Newark Brownfield Site to Increase Student Housing, Environmental Alliance Monitor, http://www.envalliance.com/monitor&pubs/1998fall.htm, 1998, pp. 1-8.
"RCC RemedOzone Mobile Remediation System", RCC, 2 pages, date unknown.
Santa Barbara I Manufactured Gas Plant Site, California EPA, Jan. 2002, pp. 1-6.
Single-phase Membrane Ozonation of Hazardous Organic Compounds ill Aqueous Streams. P.V. Shanbhag, et al., Journal of Hazardous Materials 41, 1995, pp. 95-104.
Strategies to Protect Your Water Supply from MTBE, Komex Industries, http://www.komex.com/industries/remediation.htm, 2002, pp. 1-8.
Technology Status Review in Situ Oxidation, Environmental Security technology Certification Program, Nov. 1999, pp. 1-42.
The Ultrox System: USEPA Ultrox International Ultraviolet Radiation/Oxidation Technology, Applications Analysis Report, EPN540/A5-89/012, Sep. 1990.
Reaction of Ozone With Ethene and Its Methyl- and Chlorine-Substituted Derivatives in Aqueous Solution, P. Dowideit et al., Environmental Science & Technology, vol. 32, No. 8, pp. 1112-1999.
Toxins, toxins everywhere, K.K. Wiegner. Forbes, Jul. 22, 1991, pp. 298.
Treatment of VOC-Contaminated Groundwater by Hydrogen Peroxide and Ozone Oxidation, Bellamy, W.D., G.T. Hickman, P.A. Mueller, and N. Ziemba, Res. J. Water Pollution Control Fed. 63, 120., 1991.
Typical Applications of Ozone, ARCE Systems, Inc., http://www.arcesystems.com/products/ozone/applications.htm, Feb. 2000, pp. 1-2.
Who's Afraid of MTBE?, K.P. Wheeler et al., Manko, Gold & Katcher, http://www.rccnet.com/Wheels.htm, Jul. 2000, pp. 1-5.

Yuma Pilot-Testing Ozone Sparging, Stripping, Pasha Publications, Defense Cleanup, Nov. 8, 1996, pp. 5-6.

*ThinkVillage-Kerfoot LLC* v. *Groundwater & Environmental Services, Inc.*, Complaint for Patent Infringement, US District Court for the District of Massachusetts, Oct. 7, 2008, 5 pages.

*ThinkVillage-Kerfoot LLC* v. *Groundwater & Environmental Services, Inc.*, Answer and Counterclaims, Civil Action No. 1:08-cv-11711-GAO, Dec. 5, 2008, 7 pages.

*ThinkVillage-Kerfoot LLC* v. *Groundwater & Environmental Services, Inc.*, Amended Answer and Counterclaims, Civil Action No. 1:08-cv-11711-GAO, Dec. 15, 2008, 7 pages.

*ThinkVillage-Kerfoot LLC* v. *Groundwater & Environmental Services, Inc.*, Plaintiff's Response to Defendant Groundwater & Environmental Services, Inc.'s Amended Counterclaims, Civil Action No. 1:08-cv-11711-GAO, Dec. 30, 2008, 5 pages.

Civil Action No. 1:08-cv-11711-GAO, Groundwater & Environmental Services, Inc.'s Objections And Responses To Plaintiff's Requests For Production Of Documents And Things, Mar. 4, 2009, 54 pages.

Civil Action No. 1:08-cv-11711-GAO, Groundwater & Environmental Services, Inc.'s Objections And Answers To Plaintiff's Interrogatories, Mar. 4, 2009, 10 pages.

Civil Action No. 1:08-cv-11711-GAO, ThinkVillage-Kerfoot, LLC's Responses To Defendant's Interrogatories (Nos. 1-11) Apr. 9, 2009, 12 pages.

Civil Action No. 1:08-cv-11711-GAO, ThinkVillage-Kerfoot, LLC's Objections And Responses To Defendant's First Set of Requests For Production (Nos. 1-98) Apr. 9, 2009, 37 pages.

Civil Action No. 1:08-cv-11711-GAO, ThinkVillage-Kerfoot, LLC's Supplemental Responses To Defendant's Interrogatories (Nos. 7 and 8) Jun. 2, 2009, 9 pages.

PCT/US04/43634 International Search Report mailed May 18, 2005, 1 page.

PCT/US04/43634 International Preliminary Report on Patentability, Jun. 26, 2006, 5 pages.

Makarov, A. M. & Sorokin, S.S., "Heat Exchange of a Bubble Coated with a Liquid Film on the Rear Surface," Chemical and Petroleum Engineering, vol. 30, No. 2, 1994.

Abstract JP 6-238260, Aug. 30, 1994, Karuto.

U.S. Appl. No. 10/895,015, Selected pages from Image File Wrapper dated Jul. 14, 2006 through Feb. 9, 2009, 102 pages.

U.S. Appl. No. 11/485,080, Response to Office Action filed May 8, 2009, 4 pages.

U.S. Appl. No. 10/745,939, Selected Pages from Image File Wrapper dated Jun. 22, 2006 through Jul. 22, 2008, 110 pages.

U.S. Appl. No. 12/254,359, Notice of Allowance dated Apr. 1, 2009, 7 pages.

U.S. Appl. No. 12/259,051, Office Action dated Mar. 24, 2009, 6 pages.

U.S. Appl. No. 11/849,413 Selected pages from Image File Wrapper dated Sep. 4, 2007 through Mar. 10, 2009, 94 pages.

U.S. Appl. No. 09/470,167 (U.S. 6,436,285) Selected pages from File History dated Aug. 23, 2002 through Mar. 29, 2001, 38 pages.

U.S. Appl. No. 09/860,659, Selected pages from Image File Wrapper dated Aug. 13, 2002 through Aug. 23, 2004, 68 pages.

U.S. Appl. No. 09/943,111, Selected pages from Image File Wrapper dated Jan. 30, 2003 through Feb. 19, 2005, 47 pages.

U.S. Appl. No. 09/993,152, Selected pages from Image File Wrapper dated Sep. 4, 2007 through Mar. 10, 2009, 59 pages.

U.S. Appl. No. 10/223,166 (U.S. 6,596,161) Selected pages from File History dated Nov. 6, 2002 through Jul. 22, 2003, 22 pages.

U.S. Appl. No. 10/354,584 Selected pages from Image File Wrapper dated Jul. 30, 2003 through Jul. 6, 2004, 32 pages.

U.S. Appl. No. 10/365,027, Selected pages from Image File Wrapper dated Apr. 16, 2004 through May 2, 2005, 53 pages.

U.S. Appl. No. 10/602,256, Selected pages from Image File Wrapper dated Jan. 11, 2005 through Dec. 12, 2002, 33 pages.

U.S. Appl. No. 11/485,223 Selected pages from Image File Wrapper dated Feb. 26, 2008 through Mar. 11, 2009, 36 pages.

U.S. Appl. No. 10/910,441 Selected pages from Image File Wrapper dated Dec. 1, 2004 through Sep. 12, 2005, 36 pages.

U.S. Appl. No. 10/916,863 Selected pages from Image File Wrapper dated Dec. 28, 2006 through Oct. 8, 2008, 39 pages.

U.S. Appl. No. 11/594,019 Selected pages from Image File Wrapper dated Apr. 25, 2007 through Oct. 29, 2008, 45 pages.

U.S. Appl. No. 10/963,353 Selected pages from Image File Wrapper dated Aug. 23, 2005 through Dec. 13, 2006, 46 pages.

U.S. Appl. No. 10/994,960 Selected pages from Image File Wrapper dated Mar. 11, 2005 through Dec. 2, 2005, 36 pages.

U.S. Appl. No. 10/997,452 Selected pages from Image File Wrapper dated Jun. 27, 2007 through Mar. 23, 2009, 144 pages.

U.S. Appl. No. 11/146,722 Selected pages from Image File Wrapper dated Jun. 7, 2005 through Sep. 18, 2006, 70 pages.

U.S. Appl. No. 11/272,446 Selected pages from File History dated Jan. 22, 2008 through May 1, 2009, 60 pages.

U.S. Appl. No. 11/328,475 Selected pages from Image File Wrapper dated Jun. 30, 2006 through Aug. 15, 2007, 45 pages.

U.S. Appl. No. 11/409,892 Selected pages from Image File Wrapper dated Jul. 31, 2006 through May 21, 2009, 94 pages.

U.S. Appl. No. 11/485,080 Selected pages from Image File Wrapper dated May 11, 2007 through Jan. 9, 2009, 83 pages.

U.S. Appl. No. 12/177,467 Selected pages from Image File Wrapper dated Dec. 29, 2008 through Jun. 12, 2009, 20 pages.

U.S. Appl. No. 11/485,223 Office Action mailed Jun. 15, 2009, 8 pages.

Canadian Patent Application No. 2,351,257, Office Action dated May 1, 2009, 4 pages.

U.S. Appl. No. 12/177,467 Notice of Allowance dated Sep. 2, 2009, 8 pages.

U.S. Appl. No. 12/259,051 Notice of Allowance dated Aug. 24, 2009, 7 pages.

U.S. Appl. No. 11/485,223 Notice of Allowance dated Sep. 2, 2009, 7 pages.

U.S. Appl. No. 12/272,462 Notice of Allowance dated Sep. 21, 2009, 8 pages.

U.S. Appl. No. 11/409,892, Notice of Allowance dated Oct. 1, 2009, 5 pages.

Canadian Application No. 2,441,259 Office Action dated Oct. 14, 2009, 7 pages.

* cited by examiner

Scheme B
Central Water Flow Through Cylindrical Spargepoint with Inside Discharge (nozzle)

PERMANGANATE-COATED OZONE FOR GROUNDWATER AND SOIL TREATMENT WITH IN-SITU OXIDATION

This application is a continuation-in-part, claims the benefit of, and incorporates by reference in its entirety, U.S. patent application Ser. No. 10/895,015; filed Jul. 20, 2004 and entitled "Superoxidant Poiser for Groundwater and Soil Treatment with In-Situ Oxidation-Reduction and Acidity-Basicity Adjustment."

BACKGROUND

This invention relates generally to water remediation systems and techniques.

There is a well-recognized need for removal of subsurface contaminants that exist in aquifers and surrounding soils. Such contaminants can include various man-made volatile hydrocarbons including chlorinated hydrocarbons, e.g., volatile organic compounds such as chlorinated olefins including trichloroethene (TCE), tetrachloroethene (PCE), cis 1,2-dichloroethene, vinyl chloride and 1,4 Dioxane, mixed in with chloroethenes and so forth. Other compounds include aromatic or polyaromatic ring compounds such as benzene, toluene, methylbenzene, xylenes, naphthalene, and propellants or explosives such as nitroanilines, trinitrotoluene, and so forth. The groups of compounds are characterized by aromatic ring structures also include alkyl substituted aromatic hydrocarbons.

Chemical oxidants such as permanganate, oxygen, ozone, hydrogen peroxide are used for treatment of certain contaminants. Permanganate has an advantage over certain of these chemical oxidants because of its long half-life which is measured in months. Current practices of in-situ oxidation, with a permanganate involves directly injecting permanganate into unsaturated or groundwater saturated soils to induce chemical oxidation reactions with contaminants.

SUMMARY

Application of permanganate using current practices has disadvantages. For example, permanganate is poorly reactive with 1,4 dioxane and benzene, limiting its use with certain mixtures of these compounds with chloroethenes. When applied as a liquid wash, permanganate produces carbon dioxide gas ($CO_2$) and manganese dioxide ($MNO_2$), a precipitate, which slows down the effectiveness of the permanganate over time.

Typically, when released into saturated soils at the top of an aquifer, the permanganate tends to displace water because of its density and moves downwards, often irregularly according to conditions of the soil, e.g., if the soil is partially laid down in layers the permanganate can move in fluvial channels, and so forth.

Permanganates may be involved in secondary reactions with soil or bedrock matrix. Such secondary reactions can occur for example with permanganates such as potassium or sodium permanganates. That is, the permanganates tend to react excessively with the soil minerals, lessening the permanganates efficiency as an oxidant. Examples of secondary reactions include those involving metallic or nonmetallic cations such as iron ($Fe^{+2}$ or $Fe^{+3}$), manganese ($Mn^{+2}$ or $Mn^{+4}$), calcium ($Ca^{+2}$), copper ($Cu^{+2}$ and $Cu^{+1}$), chromium ($Cr^{+3}$ and $Cr^{+6}$), and so forth. These cations under oxidation can become involved in secondary reactions minimizing the effectiveness of the added potassium permanganate or sodium permanganate and causing undesirable by-products.

Some or all of these disadvantages can be overcome by using permanganate or a precursor, e.g., potassium manganate with ozone, such as in a coating on microbubbles entrapping an air/ozone gas mixture. Generally, the microbubbles are of the order of 0.1 microns to 200 microns.

According to an aspect of the present invention, a method includes introducing an air stream including ozone delivered with a permanganate to decompose contaminants, with the permanganate to ozone being in a molar ratio of 1-20 to 1.

The following are embodiments within the scope of the claims. The permanganate is delivered as a coating over microbubbles including the air/ozone gas stream. Introducing includes introducing air and ozone into the soil through a microporous diffuser. Introducing includes introducing air and ozone as the gas and the permanganate as a liquid into a microporous diffuser. The microporous diffuser includes promoters or nutrients such as catalyst agents including iron containing compounds such as iron silicates or palladium containing compounds such as paladized carbon and platinum that contact microbubbles that emanate from the microporous diffusers. The microporous diffusers have a pore size in the range of about 0.1 to 200 microns. The air/ozone has up to 10% ozone by volume as a gas entrapped in microbubbles. The permanganate is up to 40 percent liquid volume as a liquid that coats the microbubbles. Introducing includes introducing air and ozone as a gas mixture entrapped in microbubbles and sodium permanganate as a liquid coating over the microbubbles. The permanganate is selected from the group consisting of sodium permanganate and potassium permanganate and precursor, potassium manganate.

According to an additional aspect of the present invention, a method of treating contaminants in a formation includes introducing a hydro-peroxide into the formation and introducing an air/ozone gas stream delivered with a permanganate into the formation to decompose the contaminants.

The permanganate is delivered as a surface layer over microbubbles including the air/ozone gas stream. The hydro-peroxide is delivered as a surface layer over microbubbles including an air/ozone gas stream. The permanganate is delivered as a surface layer over microbubbles including the air/ozone gas stream, and the hydro-peroxide is delivered as a surface layer over different microbubbles including an air/ozone gas stream. Introducing peroxide includes introducing air and ozone as a gas and the hydro-peroxide as a liquid into a microporous diffuser. Introducing permanganate includes introducing air and ozone as a gas and the permanganate as a liquid into a microporous diffuser. The method includes waiting for a period of time after introducing the hydro-peroxide before introducing the permanganate. The method includes waiting for a period of time after introducing the hydro-peroxide before introducing the permanganate to allow the hydro-peroxide to decompose before introducing the permanganate. The microporous diffusers have a pore size in the range of about 0.1 to 200 microns. Introducing includes introducing air and ozone as a gas entrapped in microbubbles and sodium permanganate as a liquid coating over the microbubbles. The air/ozone is ozone up to 10% volume as a gas entrapped in microbubbles and potassium permanganate is in a ratio of 1-20 to 1 of permanganate to ozone.

According to an additional aspect of the invention, an apparatus includes a source of permanganate, a diffuser that allows delivery of the permanganate and air ozone to a soil formation and a mechanism to deliver the permanganate and air/ozone to the diffuser. The apparatus also includes a controller to control delivery of the permanganate and the air/ozone to the mechanism.

One or more of the following advantages may be provided by one or more aspects of the invention.

The combination of ozone and permanganate allows fast-acting ozone to react with 1,4 Dioxane, Benzene, and its derivatives, expanding the oxidative potential of the permanganate with other compounds.

Because permanganate is transported with microbubbles, it is actively dispersed rather than relying on density alone to distribute the permanganate. Thus, the microbubble transport mechanism provides better diffusion and distribution of permanganate laterally, since buoyancy will push the coating laterally and upwards through the formation, reducing the tendency to form dense vertical chimneys with only lateral spreading in highly permeable layers by downwards density spreading. The buoyancy of the microbubbles can be controlled by adjusting density of the permanganate and thickness on the microbubble. The density of the permanganate coating on the microbubbles allows for the adjustment of the buoyancy of the coated micro or nano sized bubbles, since with a thick enough coating neutral buoyancy can be reached.

The microbubbles allow for a more effective distribution of the permanganate in both laterally and vertically dimensions than density-driven dispersion of prior techniques. With use of bubble surging or pulsing the bubbles can remove $CO_2$ and loosen up crust formations, improving longer-term reactivity of permanganate. The coating of sodium or potassium permanganate on the microbubbles drawing contaminates such as highly volatile or volatile organic compounds to permanganate coating according to Henry's Constant, thus reducing side reactions of the sodium or potassium permanganates with mineral surfaces in the soil substrate. Through the use of Henry'is partitioning from liquid to gas, volatile organic ethenes are "extracted" or drawn into the coating improving reaction efficiency.

The combination of the ozone-air in the microbubbles and the permanganate increases the oxidation potential of the permanganate, allowing treatment of 1,4 Dioxane, mixed in with chloroethenes. Examples of permanganates include sodium and potassium permanganates.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
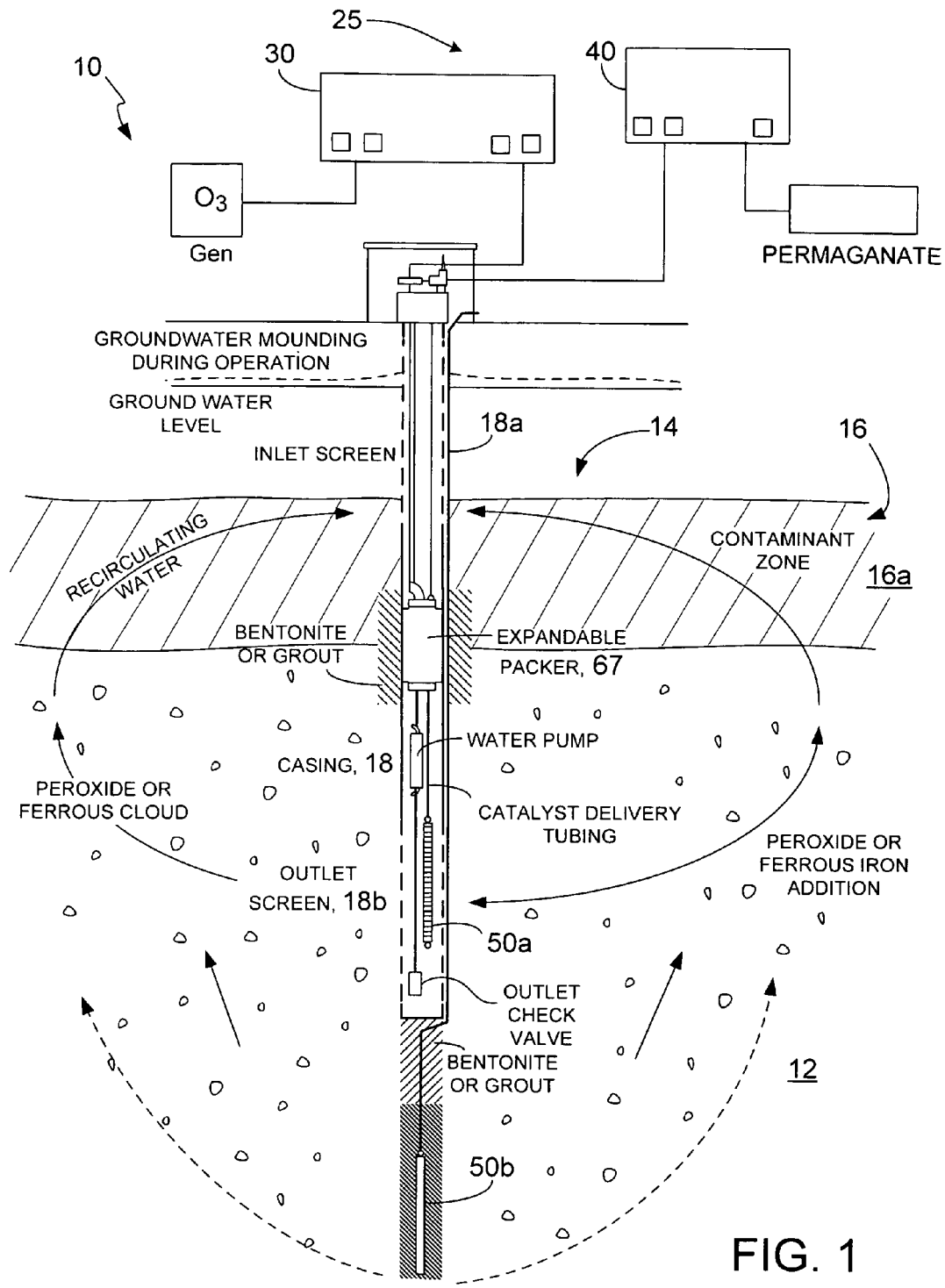
FIG. 1 is a diagram depicting an apparatus for recirculation well system.

Referring to FIG. 1, an example for a treatment system 10 to treat contaminants in a subsurface aquifer 12 includes a sparging apparatus 14 that is disposed through a soil formation 16. In this arrangement, the sparging apparatus 14 is disposed through a soil formation 16 e.g., a vadose zone 16a and an underlying aquifer 12. The sparging apparatus 14 includes a casing 18 positioned through a borehole disposed through the soil formation 16. The casing 18 has an inlet screen 18a disposed on an upper portion thereof and an outlet screen 18b disposed on a bottom portion thereof. Disposed through the casing 18 is a first microporous diffuser 50a. Alternatively, a slotted well-screen could be used. The microporous diffuser 50a is a laminate microporous diffuser. A second microporous diffuser 50b is disposed in a borehole that is below the borehole containing the casing 18, and is surrounded by a sand pack and isolated by Bentonite or a grout layer from the borehole that has the first microporous diffuser 50a. Also disposed in the casing is a packer 17 that isolates the upper screen 18a from the lower screen 18b and appropriate piping to connect sources of decontamination agents to the microporous diffusers 50a, 50b. When fluid is injected through the microporous diffusers 50a, 50b the packer 17, screens 18a, 18b and a water pump 19 enable a re-circulation water pattern 13 to be produced in the soil formation.

Figure 2:
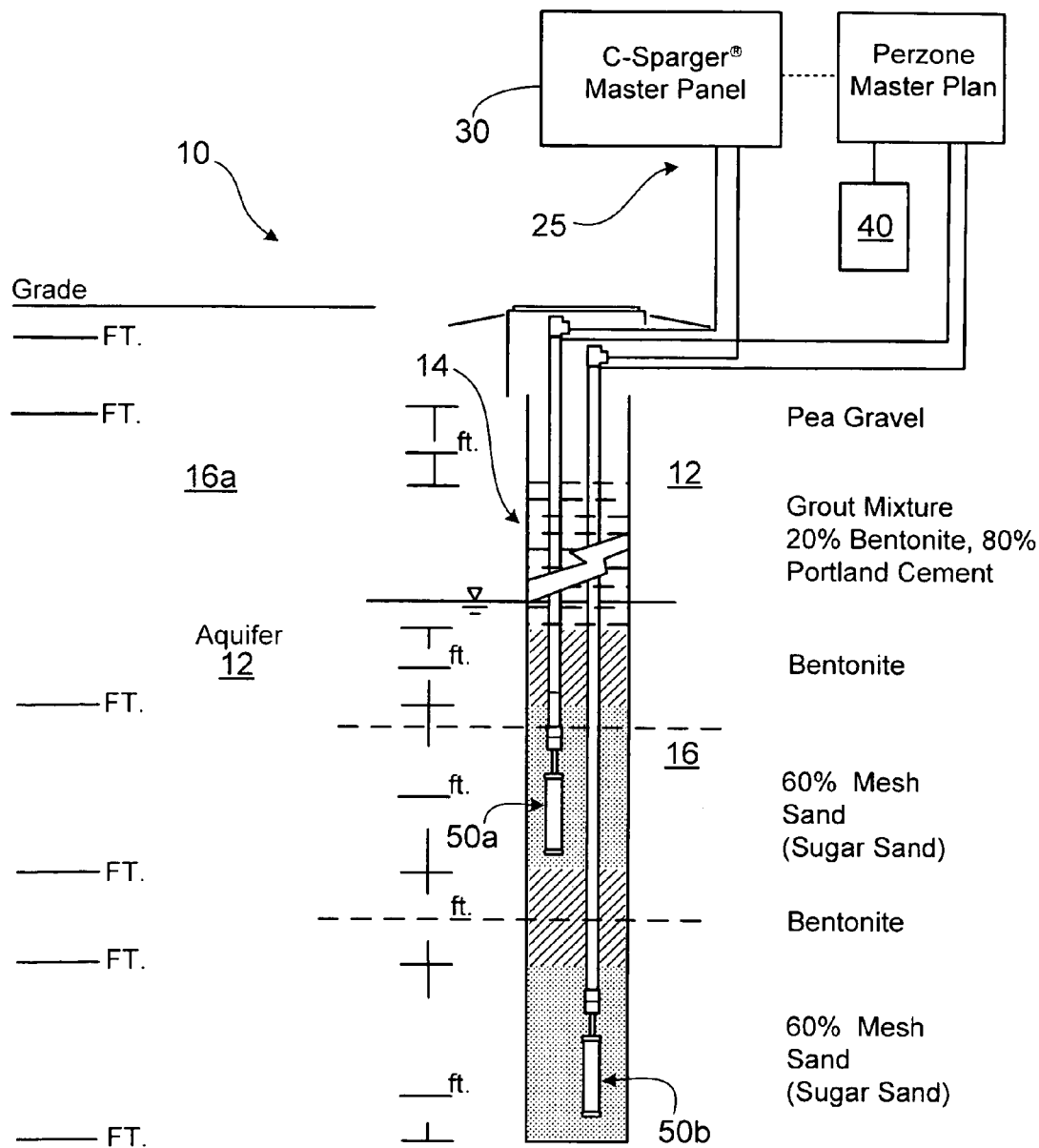
FIG. 2 is a diagram depicting an apparatus for a dual point well system.
Figure 3:
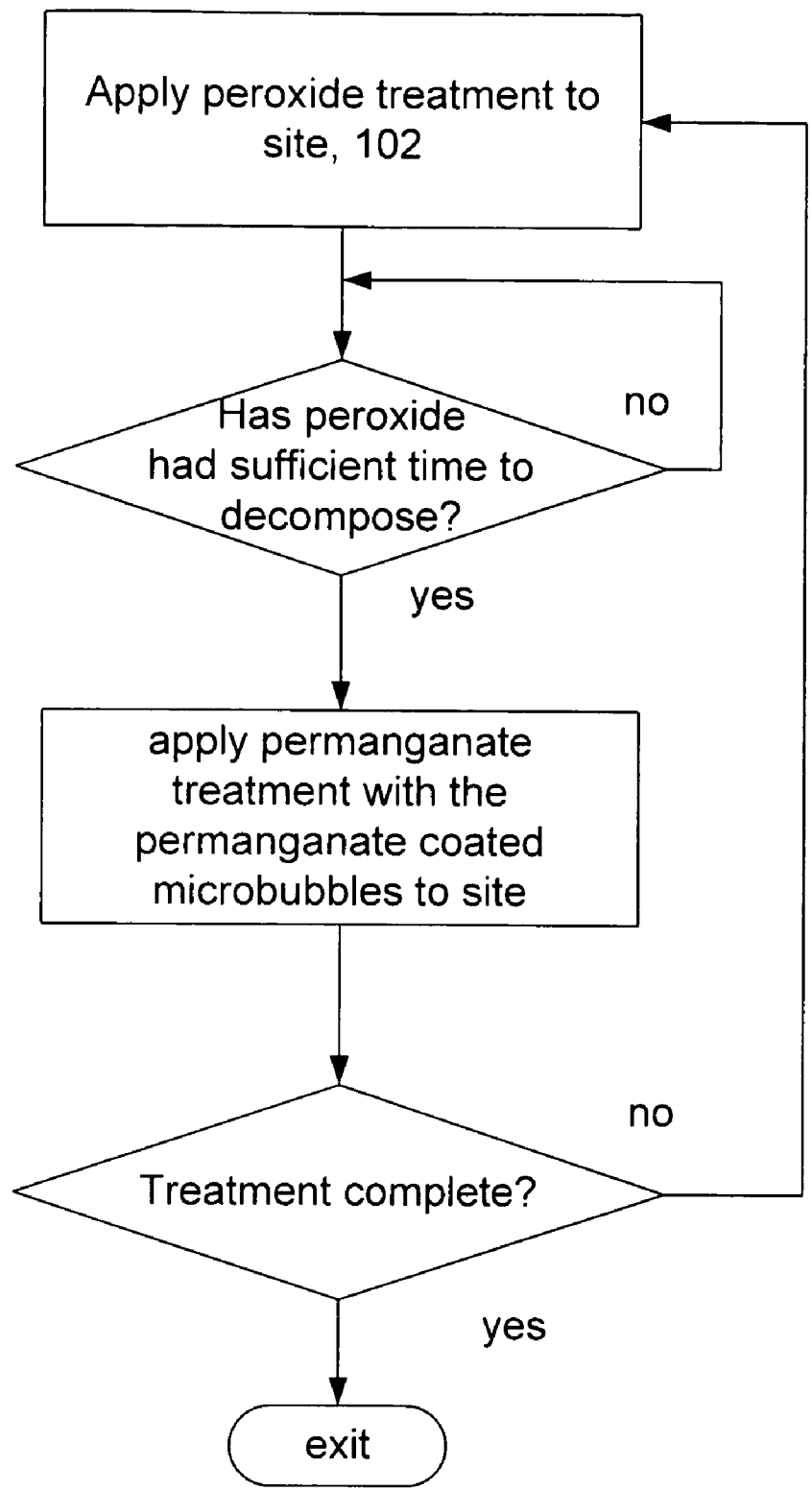
FIG. 3 is a flow chart of another treatment flow.
Figure 4:
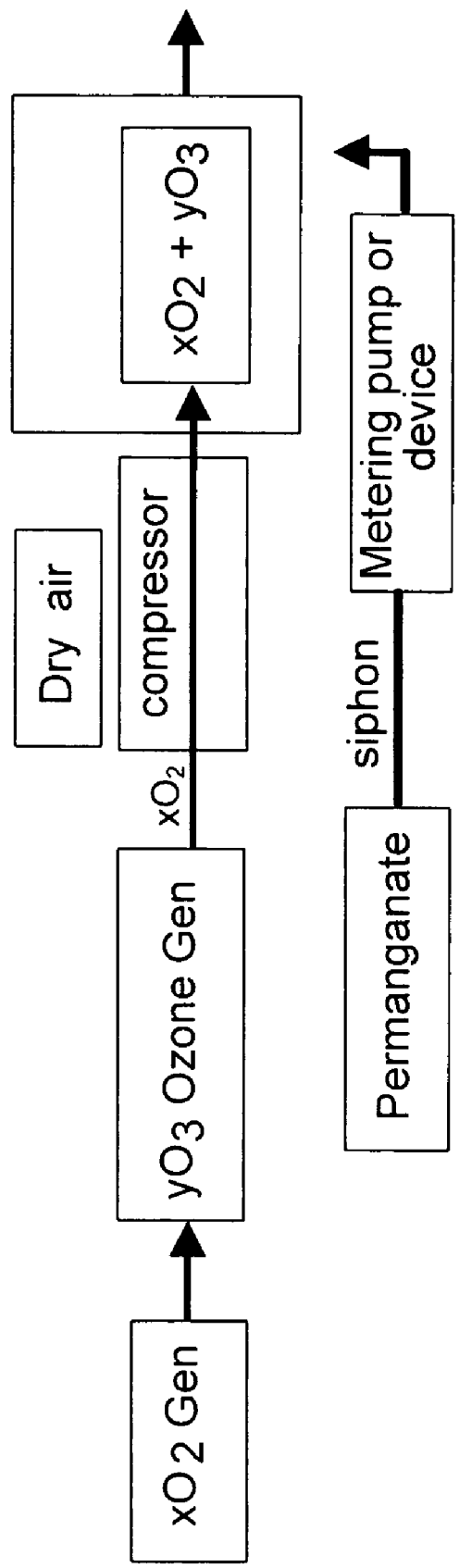
FIGS. 4-6 are diagrams depicting various treatment configurations.
Figure 5:
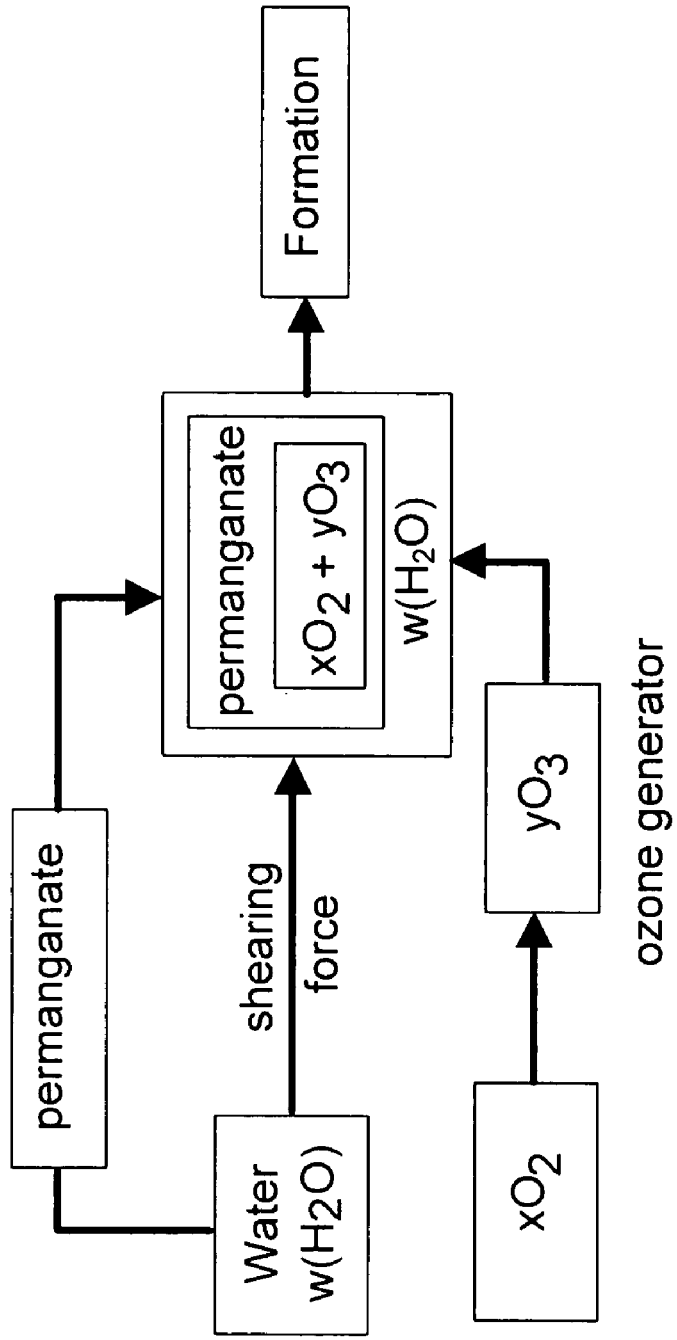
Figure 6:
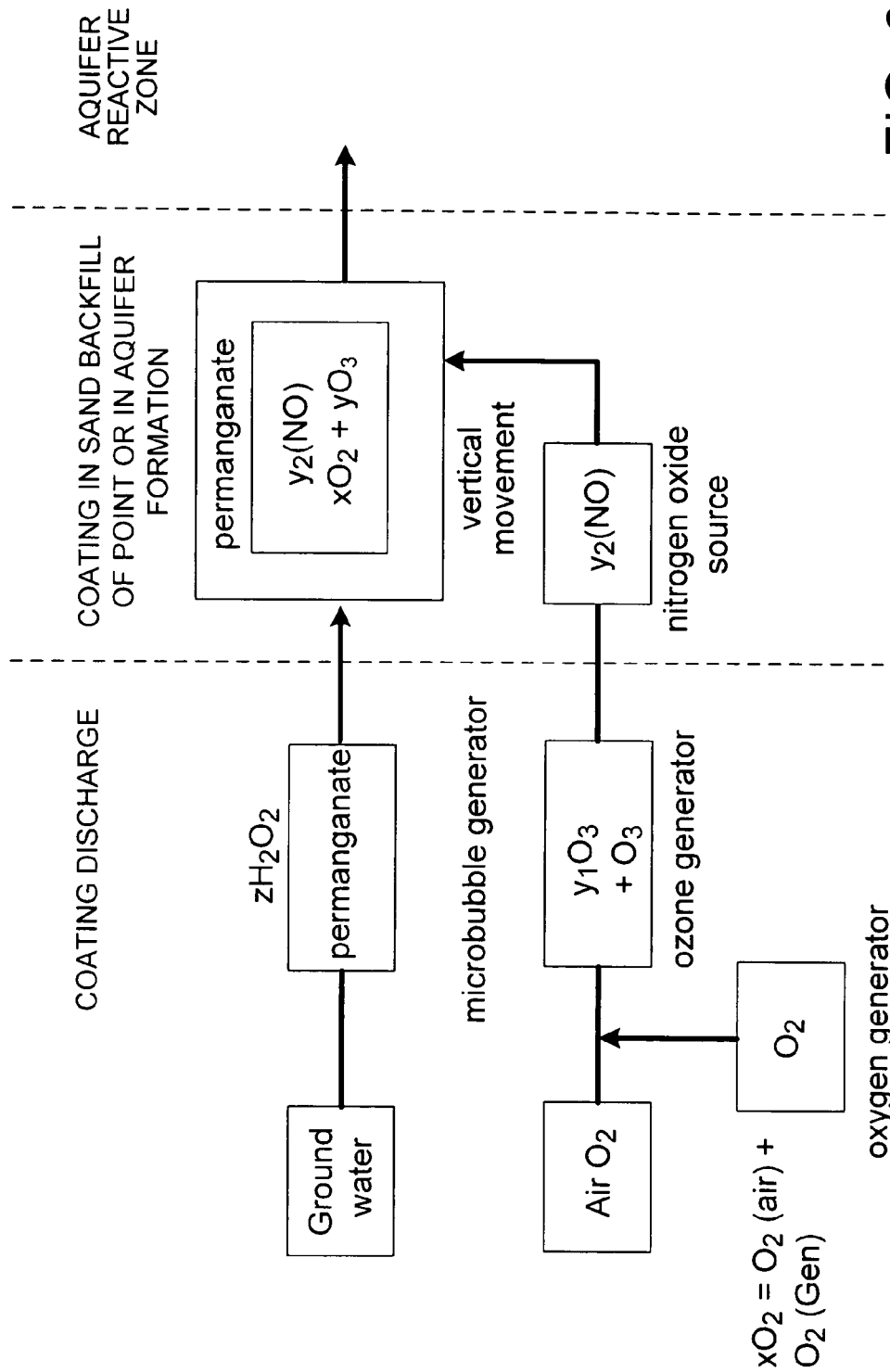

As shown in FIG. 2, other arrangements are possible. For instance, the arrangement could use two microporous diffusers packed in a sand pack, e.g., a 60 mesh sand pack, which are separated by a Bentonite layer. This arrangement is an example of a non-recirculation arrangement thus, obviating the need for the packer for instance. Still other arrangements are possible.

The arrangement 10 (or 10') also includes apparatus 25 including a gaseous decontaminate oxidizer apparatus 30 and a liquid oxidizer supply apparatus 40 that supplies potassium or sodium permanganate or a permanganate precursor such as potassium manganate. Generally, the gas sources on the oxidative side can be air, oxygen, and ozone. Some of the sources can be supplied via the ambient air, e.g., an oxygen generator and an ozone generator can be used to supply oxygen and ozone from air. The liquid supply apparatus feeds a liquid mixture the microporous diffusers 50a, 50b. The liquid source is a permanganate (potassium or sodium) solution for example. The system feeds the microporous diffusers 50a, 50b with the gas stream, typically air and ozone through a central portion of the microporous diffuser producing microbubbles that exanimate from the central portion of the microporous diffuser where they come in contact with the permanganate solution, producing microbubbles with a permanganate coating on the bubbles.

Typically, the permanganate solution is maintained at a molar ratio of about 1-3 to 1 (permanganate to ozone), more specifically, 1 to 1 for efficient reactivity. This is equivalent to about 3 grams of permanganate to 1 gram of ozone (2.47 gms. $MnO4$ to 1 gm $O3$).

Under field conditions, permanganate, like peroxide, would tend to react more frequently with soil minerals, requiring a ratio of 1-20 to 1 or 1 to 20 times (more specifically 4-20 to 1) the ozone mass weight to compensate for soil natural oxidant demand (NOD) loss. The air/ozone mixture can have ozone up to about 10% volume as a gas entrapped in microbubbles, and potassium permanganate as a liquid coating over the microbubbles.

Several advantages are provided by coated microbubbles entrapping an air-ozone gas, with the sodium or potassium permanganate. Because permanganate is transported with microbubbles, it is actively dispersed rather than relying on density alone to distribute the permanganate. Thus, the microbubble transport mechanism provides better diffusion and distribution of permanganate laterally, since buoyancy will push the coating laterally and upwards through the formation, reducing the tendency to form dense vertical chimneys with only lateral spreading in highly permeable layers by downwards density spreading.

In addition, the density of the permanganate coating on the microbubbles allows for the adjustment of the buoyancy of the coated micro or nano sized microbubbles, since with a thick enough coating neutral buoyancy can be reached.

The coating of sodium or potassium permanganate on the microbubbles drawing contaminates such as highly volatile or volatile organic compounds to permanganate coating according to Henry's Constant, and thus reducing side reactions of the sodium or potassium permanganates with mineral surfaces in the soil substrate.

The combination of the ozone-air in the microbubbles and the sodium or potassium permanganate increases the oxidation potential of the permanganate, allowing treatment of 1,4 Dioxane, mixed in with chloroethenes for example. This is an especially commercially useful example because in states such as California the compound 1,4 Dioxane was often added to containers holding chloroethenes to inhibit corrosion of the container. In California the 1,4 Dioxane the maximum permissible contaminant level (MCL) is set at 4 ppb, an even more stringent level than levels set for the chloroethenes.

Referring to FIG. 3, another treatment flow is shown. This treatment involves the use of a peroxide treatment followed by permanganate treatment with the permanganate coated microbubbles. A preferred treatment with peroxide is disclosed in U.S. Pat. No. 6,436,285 entitled "Laminated Microporous Diffuser" and/or U.S. Pat. No. 6,582,611 entitled "Groundwater and Subsurface Remediation," both of which are incorporated herein by reference, although other treatments could be used such as direct injection of a peroxide, such as hydrogen peroxide. The peroxide treatments disclosed in the above applications involve the user of peroxide coated microbubbles.

The treatment flow uses a hydro peroxide or hydrogen peroxide treatment e.g., such as a Perozone™ treatment (available from Kerfoot Technologies, Inc. Mashpee Mass.) followed by treatment with permanganate. Generally, the permanganate is injected after the hydrogen peroxide has had a sufficient time to decompose. Typically, the time for hydrogen peroxide to decompose is about 3 to 5 days. This can be site specific, based upon the carbonate content of the soil at the site. Groundwater sampling and peroxide analysis can be conducted to confirm the absence of the peroxide.

This treatment flow would be useful for treating VOCs (chloroethenes) imbedded in other petroleum products (machine oil, diesel, TPH, etc.), which need digestion of the petroleum products to free the solvents for reaction. Other contaminants include pentachlorophenol (PCP) mixtures in mineral reactions where aromatic ring breaking with the higher oxidation potential Perozone™ preceeds the permanaganate reactions with remaining chloroethene products are other possible procedures. These would involve a large number of aromatic and saturated ring compounds (chlorinated PAHs, PCT, Cl Pesticides) whose ring structure needs to be opened for permanganate attach on the chlorinated ethenes or ethanes.

Also supplied to the microporous diffusers can be promoters or nutrients, as well as catalyst agents 42 including iron containing compounds such as iron silicates, ferrous iron, acetic acid, or palladium containing compounds such as palladized carbon or other transition metals in acid solution. In addition, other materials such as platinum may alternatively be used. The promoters or nutrients can be introduced with the permanganates.

The mixture of air/ozone affects substantial removal of contaminants such as various man-made volatile hydrocarbons including chlorinated hydrocarbons, chlorinated olefins such as tetrachloroethylene, trichloroethylene, cis 1,2-dichloroethene and vinyl chloride and other compounds e.g., aromatic ring compounds, propellants, explosives, and so forth that are found as contaminants.

The electronic and mechanical system to control the sparging apparatus 10 or 10' includes a gas pump and a liquid pump that are controlled via a mechanical time sequencer, or computer based controller, as discussed below, either of which is programmed to deliver a selected mass of each material per unit time producing a mixture of predetermined oxidation potential. The oxidation potential, the mass/time, pressure, and time sequence are set electronically. An oxygen generator feeds an ozone generator, allowing the ratio of ozone to oxygen to be set. The liquid delivered is water and permanganates.

A less efficient technique to introduce liquid would include separating gas introduction and liquid introduction in the substrate by using sand-packing around a central gas introduction tube or by sequentially flooding the region with a liquid, like a permanganate, above or around a single point and sending a fine bubble stream through a fine diffuser through the mixture. A secondary siphon-effect could be developed but the uniformity of coating would not be as controlled as with the techniques described above.

FIG. 4 shows a composite Laminar microporous diffuser arrangement (e.g., a Laminar Spargepoint described in U.S. Pat. Nos. 6,436,285 and 6,582,611 or obtainable from Kerfoot Technologies, Inc.) that produces an outside discharge of air/ozone bubbles having a coating of permanganate. To withstand higher ozone concentrations to maintain low molar ratios with permanganate, the Laminar Spargepoints® are constructed of Kynar® and/or stainless steel. KYNAR® is a registered trademark of Elf Atochem North America, Inc. for a Polyvinylidene Fluoride (PVDF) high molecular weight thermoplastic polymer with excellent chemical inertness.

FIG. 5 shows a central water flow through an inverted cylindrical microporous diffuser, e.g., a Spargepoint® with an interior discharge (nozzle). The arrangement involves the discharge of water through the center of a microporous double cylinder with a non-permeable sheath. The gas enters an outer zone between an outermost plastic or stainless steel barrier and an inner microporous (0.5 to 200 micron) cylinder including support material (rings or mesh) and flows towards the center. Liquid is drawn into a microporous hydrophilic layer and coats a gas stream passing there through. The liquid and gas flows may be subject to pulsing (±5 psi) of their flows at frequent intervals (e.g., 0.5 to 10 times/sec) to provide an internal shear as the bubbles exit against the shearing force from the water or liquid velocity. With this arrangement nano to micro-size bubbles can be produced to flow in a water stream out from a well screen (either re-circulated vertically or provided from surface tank, flowing outwards or towards a laterally-located withdrawal well).

FIG. 6 shows a vertical separation of permanganates with lower oxygen release. In the arrangement of FIG. 5, vertical separation occurs between the cylinders of liquid introduction and gas introduction. The microporous gas generator is placed below the liquid generator so that the rising microbubbles pass through the liquid addition. The introduction cylinders can be segregated or supplied by a line passing through the center of the other. In either case, the bubbles rise while the denser upper liquid falls. A feed tubing arrangement can be configured with a line inside a line or by parallel tubes with an external sheath that is either wrapped or molded about the tubes.

The laminar microporous diffusers, U.S. Pat. Nos. 6,436,285 and 6,582,611 or obtainable from Kerfoot Technologies, Inc. (gas/liquid Spargepoints®) or equivalents, deliver gas and liquid with the permanganate to porous zones (vadose or saturated). The microporous diffuser produces microbubbles that siphon a liquid coating, as bubbles pulsed through capillary pores, yielding a water/coating liquid/gas/coating liquid/water peristaltic transport through microscopic capillary pores of the soil. The greater the hydrostatic pressure existing on the microporous diffuser, the higher the siphoning pressure produced. This indicates that with Boyle's Law of Increased Pressure, the smaller the internal volume of the bubble causes a concomitant enlargement of the microbubble due to capillary (meniscus) pressure to accommodate a higher surface area of the microbubble (or microcylinder) in the capillaries.

The cylindrical microporous diffuser, in which the gas is sent through the center of the microporous diffuser and through micropores across a sandwiched hydrophobic microporous layer connected to the liquid supply, is the most efficient approach to produce the flow. The intense negative pressure developed during operation occurs without any pump power provided. A metering mechanism is desirable to maintain a constant flow of liquid, but if sufficient volume is not supplied, the liquid can be subjected to sufficient vacuum pressure to produce boiling (degassing) of the liquid. A vacuum relief check valve for each liquid source can be used to increase flow during these conditions.

The system uses air-ozone sparging where bubbles of air-ozone are injected into treatment areas. When air is bubbled through ground water in soil pores, dissolved VOCs transfer from the liquid to gas phase in accordance with Henry's Law.

In accordance with Henry's Law, dissolved VOCs are driven into a gas phase and the gaseous ozone is driven into an aqueous phase. This will result in various reactions occurring at the bubble-liquid interface, whether in the gas-film or liquid-film of the bubble. Whether the primary decomposition reaction is occurring in the gaseous or liquid phase, oxygenates are driven by partitioning into the bubble environment. The smaller the bubble, the greater the surface-to-volume ratio and the ability of the bubble to "strip" volatile organics, as discussed in (Kerfoot, et al., Tenth Annual Outdoor Actions Conference National Groundwater Association Columbus OH pp 77-97 (1996).

The thin film theory of Henley and Seader (1981) Equilibrium State Separation Operations in Chemical Engineering Chapter 16, John White and Sons, New York, N.Y., as summarized in Kerfoot (2002) Kerfoot, W. B. "Microbubble Ozone Sparging for Chlorinated Ethene Spill Remediation."In: Innovative Strategies for the Remediation of Chlorinated Solvents and DNAPLS in the Subsurface American Chemical Society, Division of Environmental Chemistry, Washington, D.C., describes the mass transfer of a reactant across a liquid and a gas film before it contacts the other reactant.

The high surface to volume ratio of micron-sized bubbles enhances the in situ stripping capacity (partitioning from aqueous to gaseous phase) to allow effective extraction.

Laminar Spargepoint®

The laminar Spargepoints® (or equivalent) are used to inject ozone and permanganates into the ground. The laminar Spargepoints® are made of a micro-porous flouropolymer material, or microporous stainless steel. As the ozone and permanganates are pumped into the points, they are pushed out through the micro-pores, forming a permanganate encapsulated ozone bubble. The contents of the bubble react with the contamination in the ground. Ozone may also be injected through microporous ceramic diffusers below liquid introduction by microporous or slotted screens.

Tubing

The tubing forms the connections between the C-Sparger® control panel and the hydrogen peroxide control panel to the laminar Spargepoints®. There are two types of tubing used. One is high density polyethylene or Kynar, depending upon $O_3$ concentration for the lateral runs from the control panels to the wells. The other is Teflon® in the control panels and for the hydrogen peroxide flow from the wellhead to the laminar Spargepoint®. Other types of tubing that are resistant to ozone and hydrogen peroxide can be used.

Pulsing, Siphoning, and Residence Time for Maximizing Efficiency

Adjusting downwards the size of gas bubbles allows sufficiently slow rise time to allow adequate residence time for gas/aqueous reactions to go to completion. Pulsing allows the introduction of gas bubbles, coated with liquid or surrounded by liquid (if bubble diameter is equal to or greater than capillary pore size) to be introduced, and reside in the vicinity of the compounds of concern for reaction and move upwards during the next pressure event. Rise time in saturated sands is substantially reduced by reducing the diameter of the emitted microbubbles.

If a continuous gas flow were used instead of intermittent, a continuous gas channel would be produced (as envisioned by Clayton (1998))interfering with liquid coating of the gas bubbles, lowering efficiency of reaction by rapidly transporting unreacted ozone gas into the vadose zone. Producing a continual gas flow (greater than 10 cfm through 0.010 inch slots, 1 meter long, 2 inches in diameter) can provide vertical gas travel times of greater than 2 meters/minute. In comparison, fine bubble production (0.5 to 50 micron size), can result in vertical travel times of 0.01 to 0.1 meters/minute. By extending the half-life of ozone from 0.5 to 30 hours, the residence time for reaction in a 6-meter vertical contaminated zone increases from 60 to 600 minutes, approaching the half-life of ozone.

Siphoning Effect

The movement of fine gas bubbles coated with liquid produces a lower pressure as the bubbles are injected out into the formation through Laminar Spargepoints®.

The higher the necessary gas pressure for operation against formation backpressure, the greater the negative pressure siphoning in liquid. This phenomenon may reflect smaller size microbubbles with higher surface to volume ratios evolving from Boyle's Law of Pressure, requiring more liquid to cover the emitted gas volume. Surface tension of the liquid would cause more liquid to be delivered.

A number of embodiments of the invention have been described. Nevertheless, it will be understood that various modifications may be made without departing from the spirit and scope of the invention. As an alternative, the permanganate can be introduced as an aerosol into the gas phase using a microporous diffuser along with air-ozone during peroxide treatment. The permanganate might be partially filtered by the microporous screen wall, so this might be a less effective approach.

Accordingly, other embodiments are within the scope of the following claims.

What is claimed is:

1. A method of in situ treating of groundwater, the method comprises:
    introducing an air stream including ozone gas delivered to the groundwater with a manganate or a permanganate to decompose contaminants present in the groundwater, wherein the manganate or permanganate is present in a quantity up to 40 percent liquid volume as a liquid that coats the air stream including ozone gas.

2. The method of claim 1 wherein the permanganate is delivered as a coating over microbubbles including the air/ozone gas stream.

3. The method of claim 1 wherein the manganate is delivered as a coating over microbubbles including air and ozone gas.

4. The method of claim 1 wherein introducing includes introducing air and ozone as gas and the permanganate as a liquid into a laminar microporous diffuser.

5. The method of claim 1 wherein the manganate is a permanganate precursor and is delivered as a coating over microbubbles including the air/ozone gas stream.

6. The method of claim 4 wherein the microporous diffuser has a pore size in the range of about 0.1 to 200 microns.

7. The method of claim 2 wherein the air/ozone has up to 10% ozone by volume as a gas entrapped in microbubbles.

8. The method of claim 1 wherein introducing includes introducing air and ozone as a gas mixture entrapped in microbubbles and sodium permanganate as a liquid coating over the microbubbles.

9. The method of claim 8 wherein the air/ozone has up to 10% ozone by volume, as a gas entrapped in microbubbles.

10. The method of claim 8 wherein air/ozone with ozone up to 10% volume as a gas entrapped in microbubbles and potassium permanganate as a liquid coating over the microbubbles.

11. The method of claim 1 wherein the manganate is potassium manganate.

12. A method of treating contaminants in a formation, the method comprises: introducing a hydro-peroxide into the formation; and
  introducing an air/ozone gas stream delivered with a permanganate or a manganate into the formation to decompose the contaminants, wherein the permanganate or the manganate forms a coating over microbubbles of the air and ozone gas mixture, wherein the manganate or permanganate is present in a quantity up to 40 percent liquid volume as a liquid that coats the microbubbles.

13. The method of claim 12 wherein the hydro-peroxide is delivered as a surface layer over microbubbles including an air/ozone gas stream.

14. The method of claim 12 wherein the manganate is delivered as a surface layer over microbubbles including the air/ozone gas stream, and the hydro-peroxide is delivered as a surface layer over different microbubbles including an air/ozone gas stream.

15. The method of claim 12 wherein introducing peroxide includes introducing air and ozone as a gas and the hydro-peroxide as a liquid into a microporous diffuser.

16. The method of claim 12 wherein introducing permanganate includes introducing air and ozone as a gas and the permanganate as a liquid into a microporous diffuser.

17. The method of claim 12 further comprises:
  waiting for a period of time after introducing the hydro-peroxide before introducing the permanganate or the manganate.

18. The method of claim 12 further comprises:
  waiting for a period of time after introducing the hydro-peroxide before introducing the permanganate or the manganate to allow the hydro-peroxide to decompose before introducing the permanganate or the manganate.

19. The method of claim 12 wherein introducing of the hydro-peroxide uses a first microporous diffuser and the air-ozone gas stream with a permanganate or a manganate uses a second microporous diffuser with the first and second microporous diffusers having a pore size in the range of about 0.1 to 200 microns.

20. The method of claim 18 wherein the permanganate is sodium permanganate, and introducing includes introducing air and ozone as a gas entrapped in microbubbles and sodium permanganate as a liquid coating over the microbubbles.

21. The method of claim 18 wherein the permanganate is sodium permanganate and air/ozone is ozone up to 10% volume as a gas entrapped in microbubbles and potassium permanganate is in a ratio of 1-20 to 1 of permanganate to ozone.

22. A method of in situ treating of groundwater comprises:
  providing a source of manganate; introducing the manganate and air/ozone gas through a diffuser into a soil formation with the manganate delivered as a coating over microbubbles including the air/ozone gas stream, wherein the manganate is present in a quantity up to 40 percent liquid volume as a liquid that coats the microbubbles.

23. The method of claim 22 wherein the manganate is potassium manganate.

24. The method of claim 1 wherein the relative concentrations of manganate or permanganate to ozone are in a molar ratio of 1-20 to 1.

* * * * *

UNITED STATES PATENT AND TRADEMARK OFFICE
CERTIFICATE OF CORRECTION

PATENT NO. : 7,666,316 B2
APPLICATION NO. : 11/145871
DATED : February 23, 2010
INVENTOR(S) : William B. Kerfoot It is certified that error appears in the above-identified patent and that said Letters Patent is hereby corrected as shown below:

Column 1, line 61, "cat" should read --cat- --;
Column 3, line 32, "Henry'is" should read --Henry's--;
Column 5, line 29, "user" should read --use--; line 48, "preceeds" should read --precedes--;
Column 6, line 24, "Spargepoint" should read --Spargepoint®--; line 30, "KYNAR®" should read --Kynar®--;
Column 7, line 45, "Remediatio-" should read --Remediation"--; line 46, "n.In:"" should read --In:--; line 54, "in situ" should read --in-situ--; line 57, "laminar" should read --Laminar--; line 58, "laminar" should read --Laminar--;
Column 8, line 3 "laminar" should read --Laminar--; line 7, "laminar" should read --Laminar--; line 24, "(1988))interfering" should read --(1988)) interfering--; line 60, "in situ" should read --in-situ--;
Column 10, line 31, "in situ" should read --in-situ--;

Signed and Sealed this

First Day of June, 2010

David J. Kappos
*Director of the United States Patent and Trademark Office*